United States Patent [19]

Nakamura et al.

[11] Patent Number: 4,663,991
[45] Date of Patent: May 12, 1987

[54] SYSTEM FOR CONTROLLING THE TRANSMISSION RATIO OF AN INFINITELY VARIABLE TRANSMISSION

[75] Inventors: Hiroyuki Nakamura, Higashiyamato; Masaaki Ohgami, Musashino, both of Japan

[73] Assignee: Fuji Jukogyo Kabushiki Kaisha, Tokyo, Japan

[21] Appl. No.: 644,163

[22] Filed: Aug. 24, 1984

[30] Foreign Application Priority Data

Aug. 31, 1983 [JP] Japan .................. 58-159482

[51] Int. Cl.⁴ .............................. B60K 41/16
[52] U.S. Cl. ............................ 74/868; 74/866; 474/28
[58] Field of Search .............. 474/11, 12, 17, 18, 474/28, 70; 74/866, 867, 868; 364/424.1

[56] References Cited

U.S. PATENT DOCUMENTS

| | | | |
|---|---|---|---|
| 4,152,947 | 5/1979 | Van Deursen et al. | 474/28 |
| 4,387,608 | 6/1983 | Mohl et al. | 474/12 X |
| 4,458,318 | 7/1984 | Smit et al. | 364/424.1 |
| 4,458,560 | 7/1984 | Frank et al. | 74/866 X |
| 4,459,879 | 7/1984 | Miki et al. | 474/28 |
| 4,475,416 | 10/1984 | Underwood | 474/28 X |
| 4,509,125 | 4/1985 | Fattic et al. | 74/866 X |

FOREIGN PATENT DOCUMENTS

| | | | |
|---|---|---|---|
| 48305 | 5/1983 | Japan | 474/28 |
| 191361 | 11/1983 | Japan | 474/28 |
| 17054 | 1/1984 | Japan | 474/28 |
| 2058257 | 4/1981 | United Kingdom | 28/ |

Primary Examiner—Leslie Braun
Assistant Examiner—Dwight G. Diehl
Attorney, Agent, or Firm—Martin A. Farber

[57] ABSTRACT

A system for controlling the transmission ratio of an infinitely variable transmission has a primary pulley having a hydraulically shiftable disc and a hydraulic cylinder for operating the disc, a secondary pulley having a hydraulically shiftable disc and a hydraulic cylinder for operating the disc and a belt engaged with both pulleys, and a hydraulic circuit. The system further comprises a transmission ratio control valve for controlling the fluid applied to the hydraulic cylinder of the primary pulley and for shifting the disc of the primary pulley, and devices for detecting conditions of engine operation and for producing electrical signals.

An electric control unit responds to the electrical signals to produce control signals. A solenoid operated valve is provided to respond to the control signals to control the transmission ratio control valve so as to control the transmission ratio by the pulleys.

7 Claims, 15 Drawing Figures

SYSTEM FOR CONTROLLING THE TRANSMISSION RATIO OF AN INFINITELY VARIABLE TRANSMISSION

DETAILED DESCRIPTION OF THE INVENTION

The present invention relates to a system for electronically controlling the transmission ratio of an infinitely variable belt-drive transmission for a vehicle. U.S. Pat. No. 4,152,947 discloses a control system for an infinitely variable transmission.

The infinitely variable belt-drive transmission comprises an endless belt running over a primary pulley and a secondary pulley. Each pulley comprises a movable conical disc which is axially moved by a fluid operated servo device so as to vary the running diameter of the belt on the pulley depending on driving conditions. The system is provided with an oil pressure regulator valve and a transmission ratio control valve. Each valve comprises a spool to control the oil by shifting the spool.

The primary pulley has a Pitot pressure generating device for producing Pitot pressure dependent on engine speed. The Pitot pressure is applied to one axial end of the spool of each valve to bias the spool. On the other hand, the actual transmission ratio is detected by the axial position of the movable conical disc of the primary pulley which represents the running diameter of the belt on the primary pulley. The position of the movable conical disc is transmitted to the other axial end of the spool of the pressure regulator valve. Further, manifold pressure of the engine is applied to the other axial end of the spool of the transmission ratio control valve through a vacuum operated actuator so as to control the transmission ratio. Since the conventional control system comprises various mechanical devices, the construction is very complicated. In addition, the Pitot pressure increases like a curve of second degree with increase of the engine speed. Accordingly, it is difficult to exactly control the transmission ratio in a low engine speed range. Further, the manifold pressure also changes like a curve of second degree with the change of opening degree of a throttle valve of the engine. Therefore, the control operation at high engine speed can not be properly controlled. In addition, characteristics of signals representing engine speed, manifold vacuum and pulley transmission ratio are roughly decided in accordance with engine operating conditions and cannot be corrected in dependency on various driving conditions of a vehicle.

SUMMARY OF THE INVENTION

The object of the present invention is to provide a transmission ratio control system which is provided with sensors for detecting driving conditions of a vehicle and for producing electric signals, and with control valves for controlling the pressure of fluid and the transmission ratio in dependency on the electric signals, whereby the system is simplified in construction and exact control can be achieved.

According to the present invention, there is provided a system for controlling the transmission ratio of an infinitely variable transmission for transmitting the power of an internal combustion engine, the infinitely variable transmission comprising a primary pulley having a hydraulically shiftable disc and a hydraulic cylinder for shifting the disc, a secondary pulley having a hydraulically shiftable disc and a hydraulic cylinder for shifting the disc of the secondary pulley, a belt engaged with both pulleys, and a first hydraulic circuit having a pump for supplying pressurized oil, a transmission ratio control valve having a spool responsive to engine speed for controlling the pressurized oil so as to move the disc of the primary pulley to change the transmission ratio and a drain passage, the improvement comprising: means comprising a second hydraulic circuit connected to the drain passage of the first hydraulic circuit for applying control oil from the drain passage to one end of said spool of the transmission ratio control valve so as to axially move the spool; a regulator valve provided in the second hydraulic circuit for keeping the control oil at a constant pressure; means for detecting operating conditions of the engine and for producing electrical signals; an electric control unit responsive to the electrical signals for producing control signals; and an electromagnetic valve provided in the second hydraulic circuit and responsive to the control signals for controlling the amount of the control oil applied to the spool of said transmission ratio control valve, thereby controlling the transmission ratio.

Other objects and features of this invention will be apparently understood from the following description with reference to the accompanying drawings.

DETAILED DESCRIPTION OF THE PREFERRED EMBODIMENT

Figure 1:
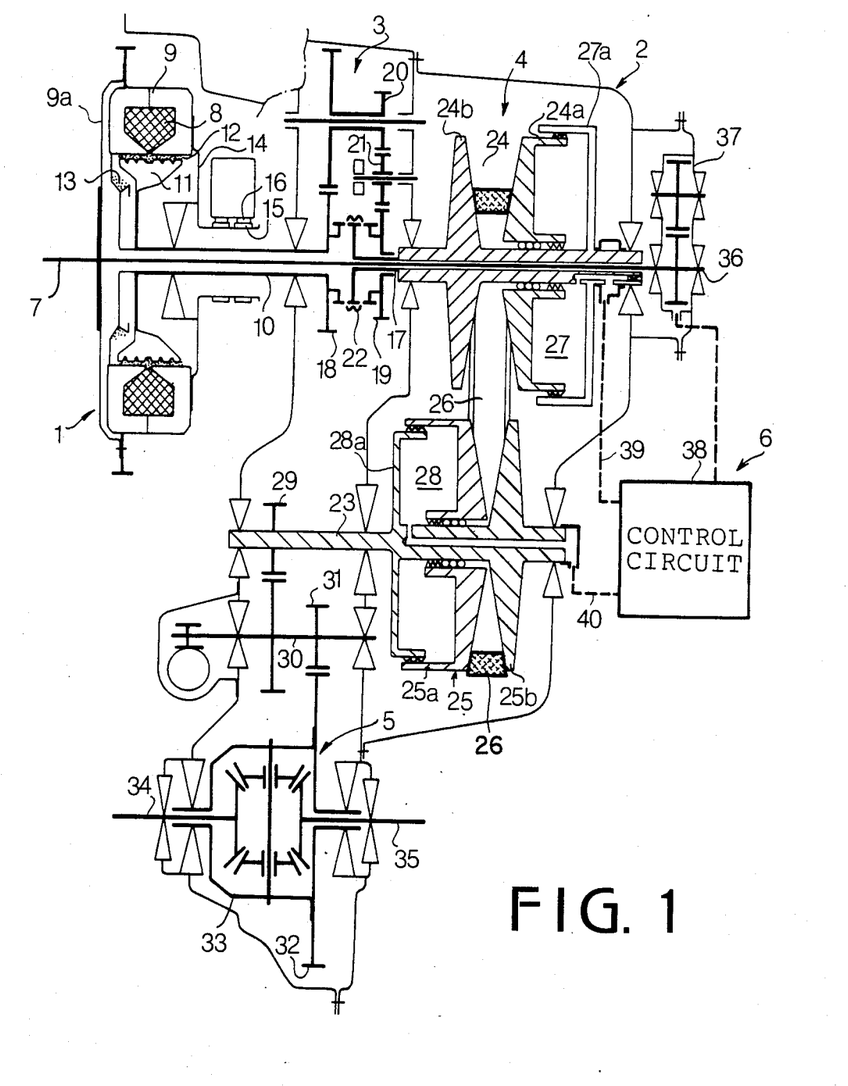
FIG. 1 is a schematic illustration of an infinitely variable belt-drive transmission employed in a control system according to the present invention.

Referring to FIG. 1, an infinitely variable belt-drive automatic transmission for a vehicle, to which the present invention is applied, comprises an electromagnetic powder clutch 1, an infinitely variable belt-drive transmission 2, a selector device 3, pulleys and belt device 4, final reduction device 5, and a pressurized oil control section 6.

A crankshaft 7 of an engine (not shown) is connected to an annular drive member 9 through a drive plate 9a of the electromagnetic powder clutch 1. The electromagnetic powder clutch 1 further comprises a driven member 11 and a magnetizing coil 8 provided in the drive member 9. The driven member 11 has its outer periphery spaced from the inner periphery of the drive member 9 by a gap 12, and a powder chamber 13 is defined between the drive member 9 and driven member 11. The Powder chamber 13 is filled with magnetic powder material. The driven member 11 is secured to an input shaft 10 of the belt-drive transmission. A holder 14 secured to the drive member 9 carries slip rings 15 which are electrically connected to the coil 8. The coil 8 is supplied through brushes 16 and the slip rings 15 with current from a control circuit for the electromagnetic powder clutch.

When the magnetizing coil 8 is excited by clutch current, drive member 9 is magnetized to produce a magnetic flux passing through the driven member 11. The magnetic powder is aggregated in the gap 12 by the magnetic flux and the driven member 11 is engaged with the drive member 9 by the powder. On the other hand, when the clutch current is cut off, the drive and driven members 9 and 11 are disengaged from one another.

In the belt-drive transmission 2, the selector device 3 is provided between the input shaft 10 and a main shaft 17. The main shaft 17 is cylindrical and is disposed coaxially with the input shaft 10. The selector device 3 comprises a drive gear 18 integral with input shaft 10, reverse driven gear 19 rotatably mounted on the main shaft 17, and a synchronizer 22 mounted on the main shaft 17. The drive gear 18 meshes with one of the gears of a counter gear assembly 20. Another gear of the counter gear assembly 20 engages with an idler gear 21, which in turn engages with the driven gear 19.

The synchronizer 22 has a well known mechanism and comprises a hub secured to the main shaft 17, and a synchronizer sleeve slidably engaged to the hub with splines. The synchronizer sleeve is adapted to engage with splines of the drive gear 18 or with splines of the driven gear 19.

At a neutral position (N range) of a selector lever (not shown), the synchronizer 22 does not engage either gear, so that the main shaft 17 is disconnected from the input shaft 10. When the synchronizer is engaged with the gear 18, the input shaft 10 is connected to the main shaft 17 through the synchronizer to provide a driving position (D range).

When the synchronizer is engaged with the gear 19, the input shaft 10 is connected to the main shaft 17 through gears 18, 20, 21 and 19 to provide a reverse driving position (R range).

The main shaft 17 has an axial passage in which an oil pump driving shaft 36 connected the crankshaft 7 is mounted. An output shaft 23 is provided in parallel with the main shaft 17. A primary pulley 24 and a secondary pulley 25 are mounted on shafts 17 and 23. A fixed conical disc 24b of the primary pulley 24 is integral with main shaft 17 and an axially movable conical disc 24a is axially slidably mounted on the main shaft 17. The movable conical disc 24a also slides in a cylinder 27a formed on the main shaft 17 to provide a servo device 27. A chamber of the servo device 27 communicates with a gear pump 37 through a passage 39 and a control circuit 38. The gear pump 37 is driven by the shaft 36.

A fixed conical disc 25b of the secondary pulley 25 is formed on the output shaft 23 opposite the movable disc 24a and a movable conical disc 25a is slidably mounted on the shaft 23 opposite disc 24b. Movable conical disc 25a has a cylindrical portion in which a piston portion 28a of the output shaft 23 is slidably engaged to form a servo device 28. A chamber of the servo device 28 is communicated with the oil pump 37 through a passage 40 and control circuit 38. A drive belt 26 engages with the primary pulley 24 and the secondary pulley 25.

Secured to the output shaft 23 is a drive gear 29 which engages with an intermediate reduction gear on an intermediate shaft 30. An intermediate gear 31 on the shaft 30 engages with a final gear 32. Rotation of the final gear 32 is transmitted to axles 34 and 35 of the vehicle driving wheels through a differential 33.

The pressure oil control circuit 38 is responsive to vehicle speed, engine speed and throttle valve position for controlling the pressurized oil supply to servo devices 27 and 28 thereby moving discs 24a and 25a. Thus, the transmission ratio is infinitely changed.

Figure 2:
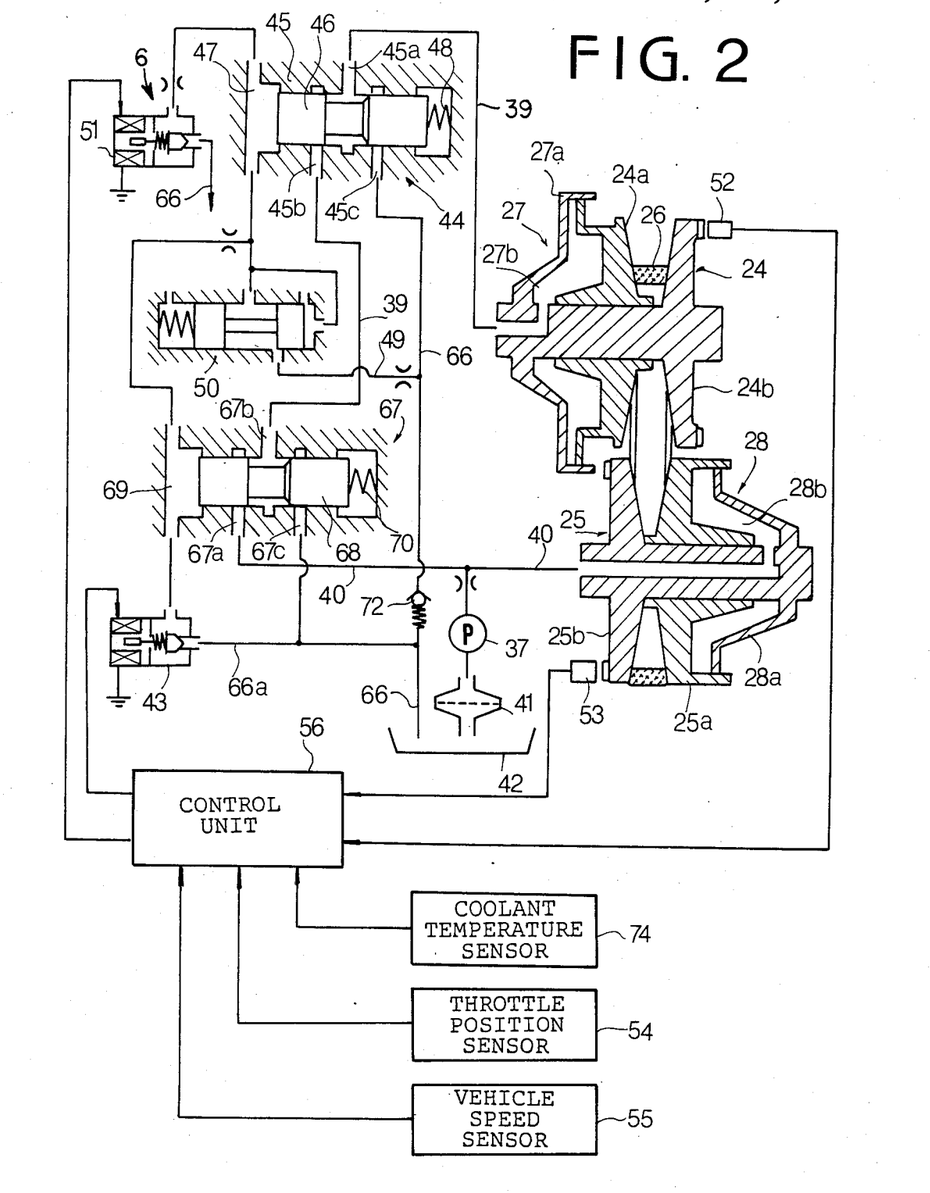
FIG. 2 is a schematic diagram showing a control system of the transmission according to the present invention with the discs of the pulleys illustrated in reverse from that of FIG. 1 and with slightly different formation of detail but operatively the same as described herein.

Referring to FIG. 2, a chamber 27b of servo device 27 is applied with pressurized oil by the gear pump 37 from an oil reservoir 42 passing through a filter 41, conduit 40, pressure regulator valve 67 and transmission ratio control valve 44. A chamber 28b of servo device 28 is applied with pressurized oil through a conduit 40 without passing through valves 67 and 44. The movable conical disc 24a is so designed that the pressure receiving area thereof is larger than that of movable conical disc 25a.

The pressure regulator valve 67 has a spool 68, end chamber 69 and a spring 70 provided opposite the end chamber. The spring 70 urges the spool 68 to the left to communicate a port 67a with a line pressure supply port 67b and the pressure of the oil supplied to the chamber 69 urges the spool 68 to the right to communicate the port 67b with a drain port 67c, so as to regulate the line pressure in passages 39 and 40.

The transmission ratio control valve 44 comprises a spool 46 in a valve body 45, end chamber 47 and spring 48 opposite the chamber. The spring 48 urges the spool 46 to the left to communicate a line pressure supply port 45b with a port 45a and the pressure of oil supplied to the end chamber 47 urges the spool to the right to communicate the port 45a with a drain port 45c. The drain port 45c is communicated to the oil reservoir 42 through a drain passage 66 and a check valve 72 and the drain port 67c is directly communicated with the reservoir 42. Further, the drain port 45c is communicated with chambers 69 and 47 through a passage 49 and a regulator valve 50 which acts to regulate the pressure of the oil to a constant pressure. The chamber 69 is communicated with the oil reservoir 42 through a solenoid operated valve 43 and a passage 66a, and chamber 47 is also communicated with the reservoir 42 through a solenoid operated valve 51.

An engine speed sensor 52 and an output shaft speed sensor 53 are provided adjacent to the primary pulley 24 and secondary pulley 25 to detect speeds of both pulleys, respectively. The system is further provided with a throttle position sensor 54 for producing a signal relative to the opening degree of a throttle valve of the vehicle, a vehicle speed sensor 55, and a coolant temperature sensor 74. Outputs from these sensors 52 to 55 are applied to a control unit 56 to control solenoid operated valves 43 and 51.

Figure 3:
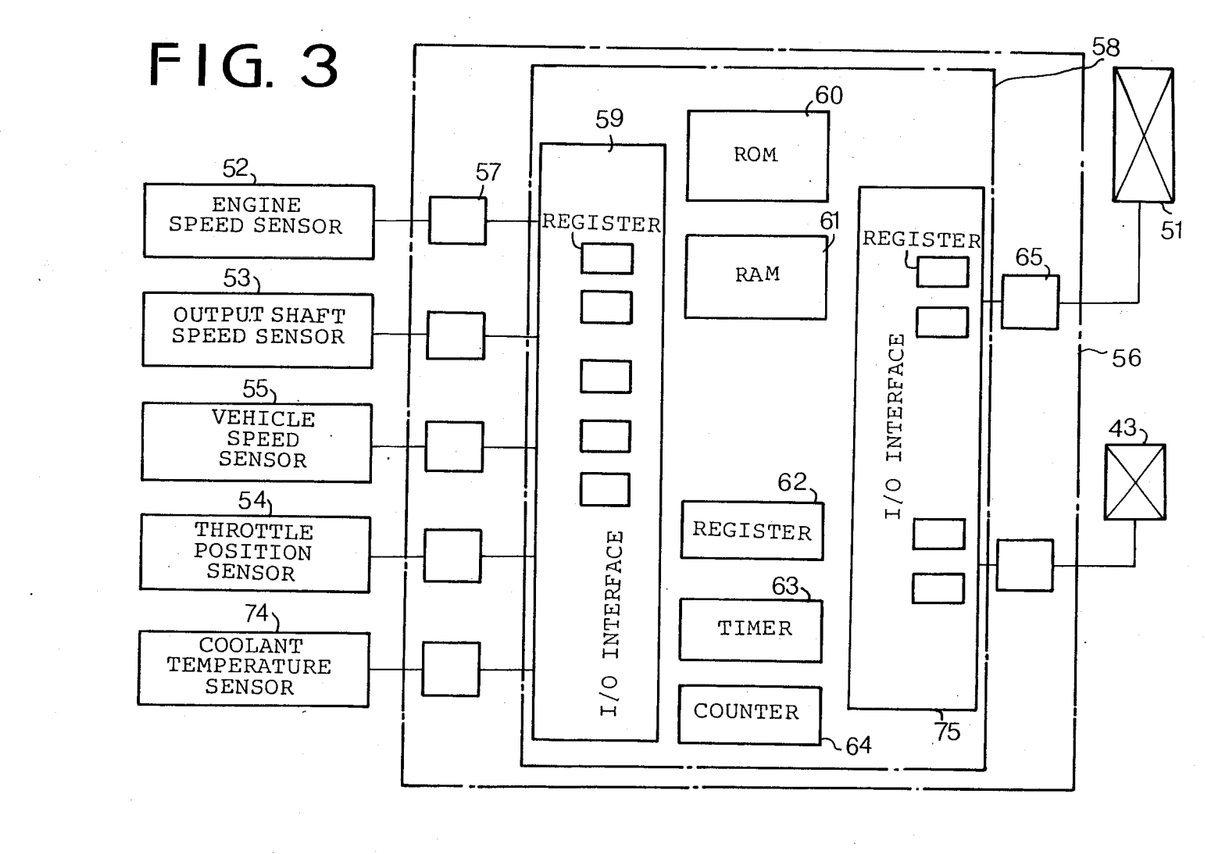
FIG. 3 is a block diagram showing a control unit of the present invention.

Referring to FIG. 3 showing the control unit 56, outputs of sensors 52 to 54 and 74 are applied to a microcomputer 58 through input signal adjusting circuits 57. The microcomputer comprises an input-output (I/O) interface 59 comprising registers, ROM 60 in which various table maps and program are stored, RAM 61 storing signals from the sensors, register 62, timer 63, counter 64, and I/O interface 75. Output signals from the I/O interface 75 are applied to the solenoid-operated valves 43 and 51 and the electromagnetic clutch 1 through output signal adjusting circuits 65. Valves 43 and 51 are operated at proper duty ratios dependent on the output signals of the control unit 56.

Figure 4A:
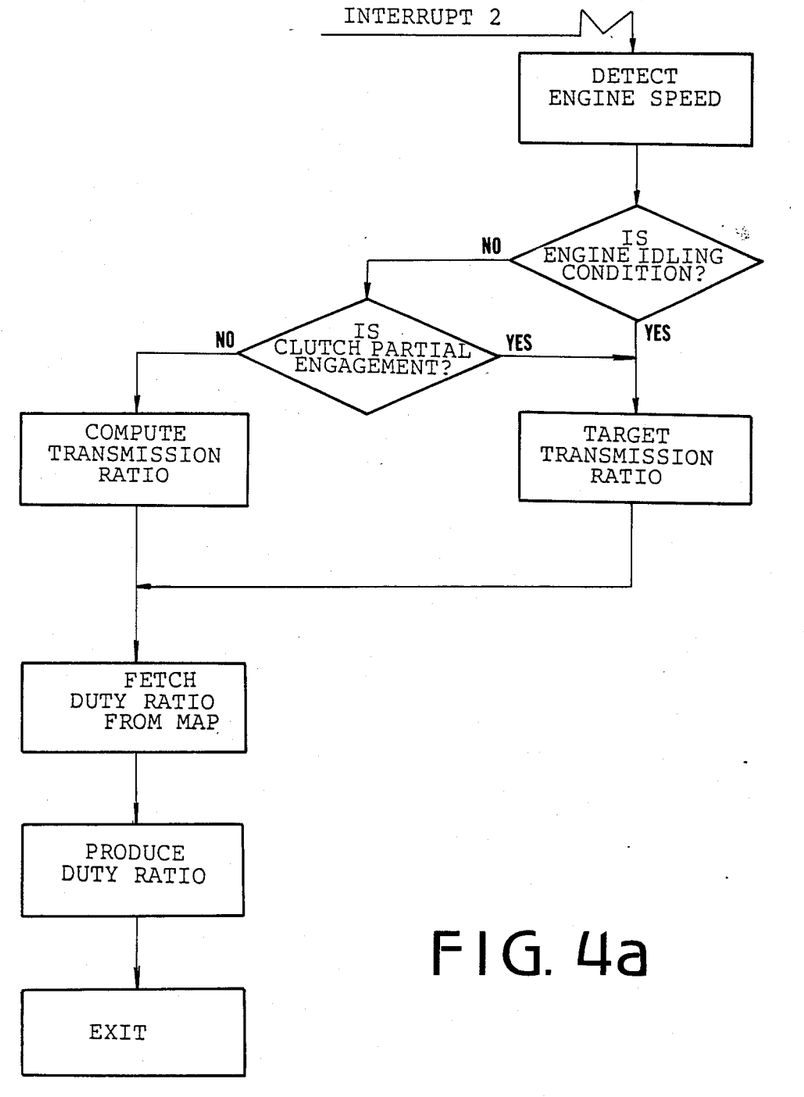
FIGS. 4(a) and 4(b) show a flow chart of line pressure control and a graph showing a characteristic of the control.
Figure 4B:
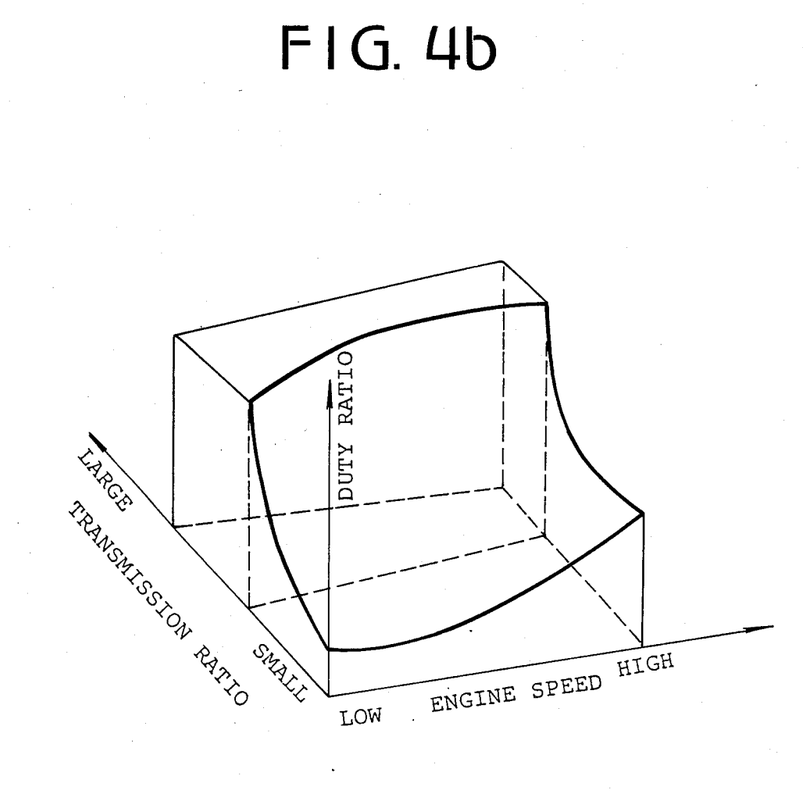

Operation of the system will be described hereinafter with reference to FIG. 4. By the engine speed signal from the engine speed sensor, the engine operating condition is judged, whether the engine is in idling condition.

A partial engagement condition of the electromagnetic powder clutch 1 is detected by the clutch current passing in the coil 8. When the engine is in idling condition and the clutch 1 is in partial engagement condition, solenoid-operated valves 43 and 51 are intermittently operated at a predetermined duty ratio. Under conditions other than the idling and partial engagement, the transmission ratio of the pulley and belt-device 4 is obtained by computing the ratio between the engine speed and the output shaft speed. In accordance with the transmission ratio and the engine speed, the necessary duty ratio is obtained from a map of FIG. 4(b). The valve 43 is operated at a duty ratio to drain the oil in the chamber 69 of the control valve 67, thereby via ports 67a, 67b increasing the pressure of oil supplied to the chamber 27b. Thus, the movable conical discs 24a and 25a are held at such a position that the belt 26 does not slip on the pulleys 24 and 25 against the transmission force of the belt.

The control operation of the transmission ratio is as follows. Referring to FIG. 5, a duty ratio $D_M$ is fetched from a map of FIG. 5(b) in accordance with the detected throttle position by the sensor 54 and vehicle speed by the sensor 55. Since it is not preferable to immediately change the transmission ratio in dependency on variations of the throttle position and the vehicle speed, there is provided a delay time of FIG. 5(d). After the delay time has lapsed, the actual transmission ratio G is computed from the engine speed and output shaft speed. A target transmission ratio GM is obtained from a map of FIG. 5(c) in accordance with the throttle position and vehicle speed. In accordance with the difference between the transmission ratios G and GM, the duty ratio correcting value $(G-GM) \times K_1$ is computed. A duty ratio signal obtained by adding the correcting value to the duty ratio $D_M$ is produced.

Figure 5A:
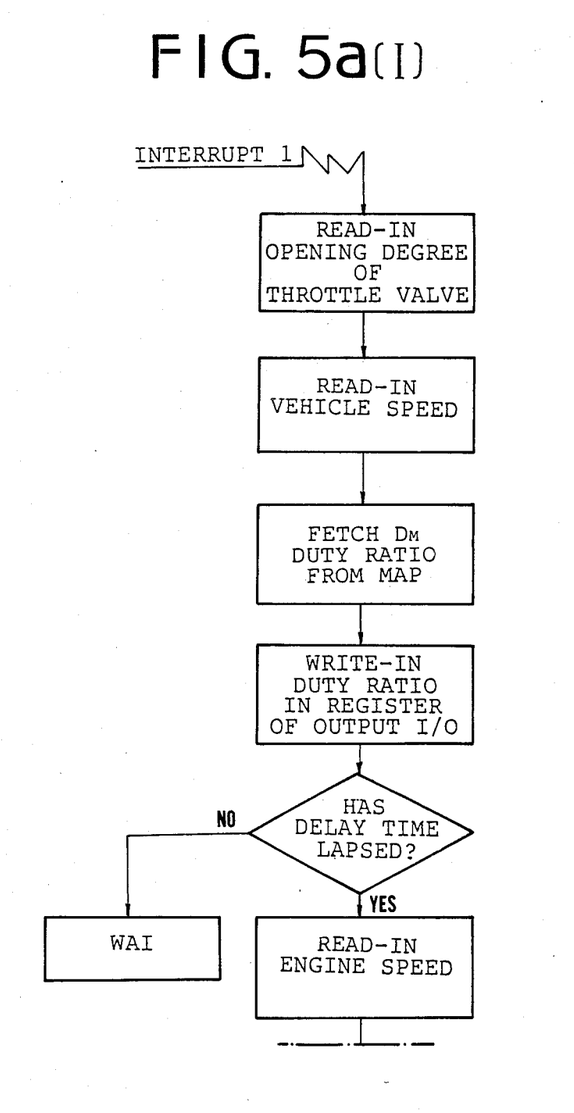
FIGS. 5(a) to 5(d) show a flow chart of transmission ratio control and graphs showing characteristics of the control.
Figure 5B:
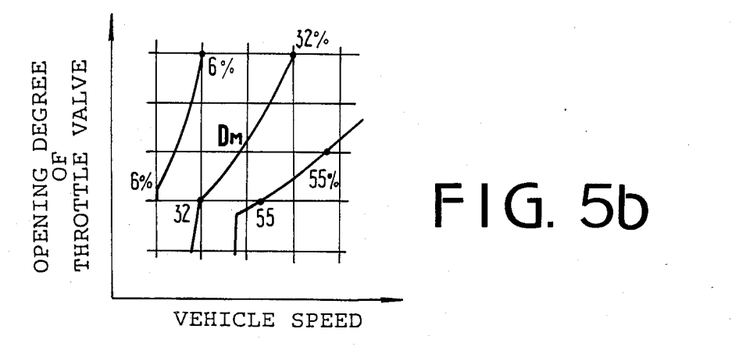

The solenoid operated valve 51 is operated by the duty ratio signal to control the amount of oil draining from the chamber 47. As the vehicle speed decreases and the opening degree of the throttle valve increases, the pressure of the oil in the chamber 47 increases. Accordingly, the amount of drain oil in the chamber 27b increases and the running diameter of the belt on the primary pulley 24 decreases, which means an increase of the transmission ratio (low speed range). The pressure in the chamber 47 decreases with an increase of the vehicle speed, causing the pressure in the chamber 27b to increase to shift the movable conical disc 24a toward the disc 24b. Thus, the running diameter increases to decrease the transmission ratio, which means high speed range.

In accordance with the present invention, various correcting controls can be easily carried out.

Figure 5C:
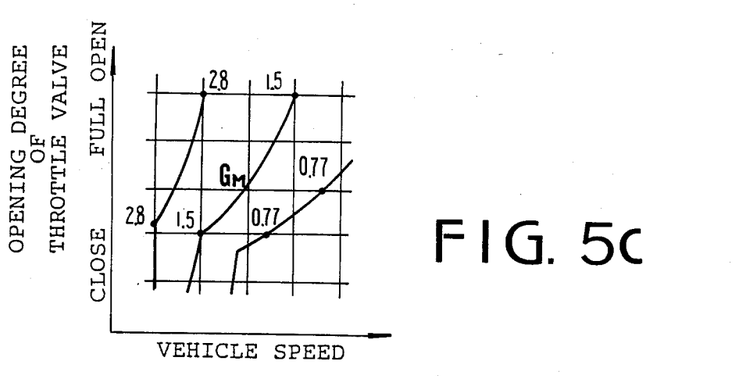
Figure 5D:
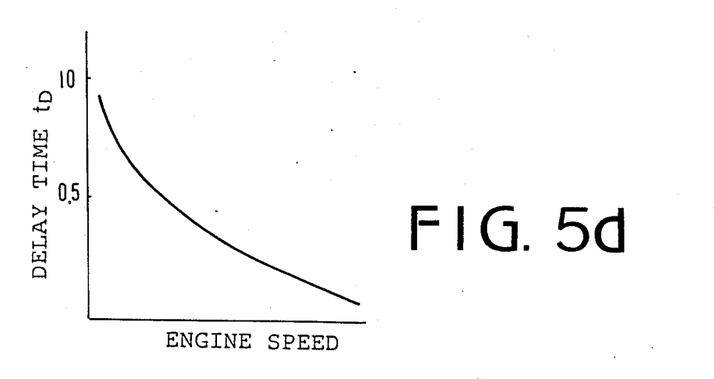
Figure 6A:
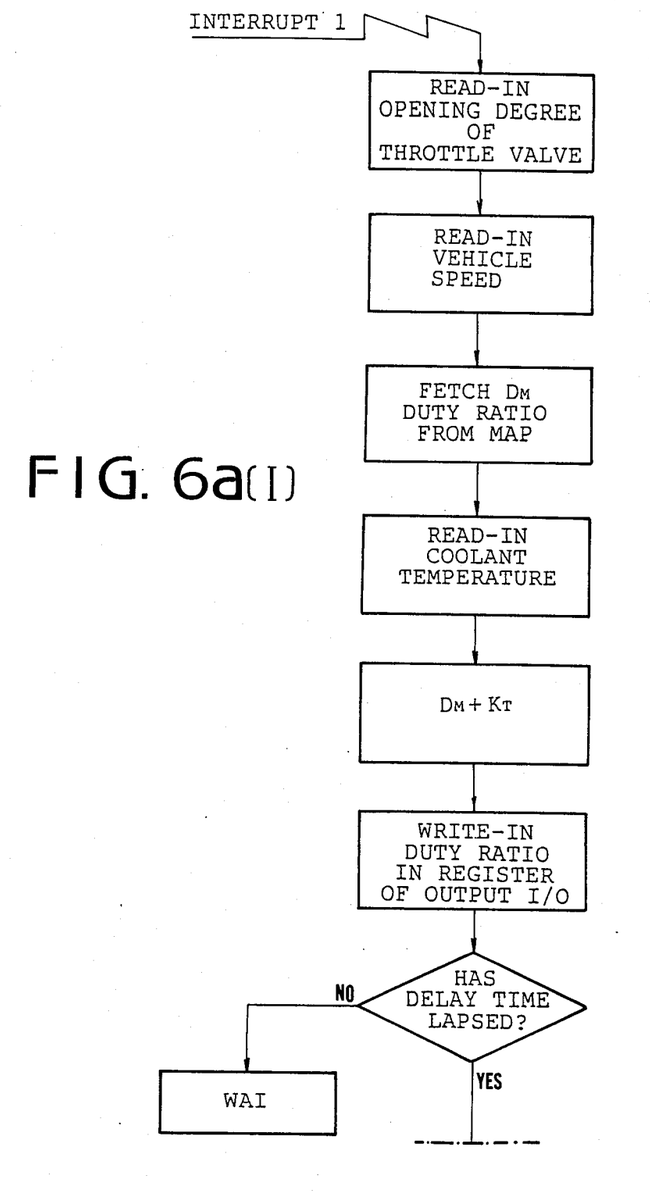
FIGS. 6(a) and 6(b) show a flow chart of low temperature compensation and a graph showing a characteristic thereof.
Figures 6A, 6B:
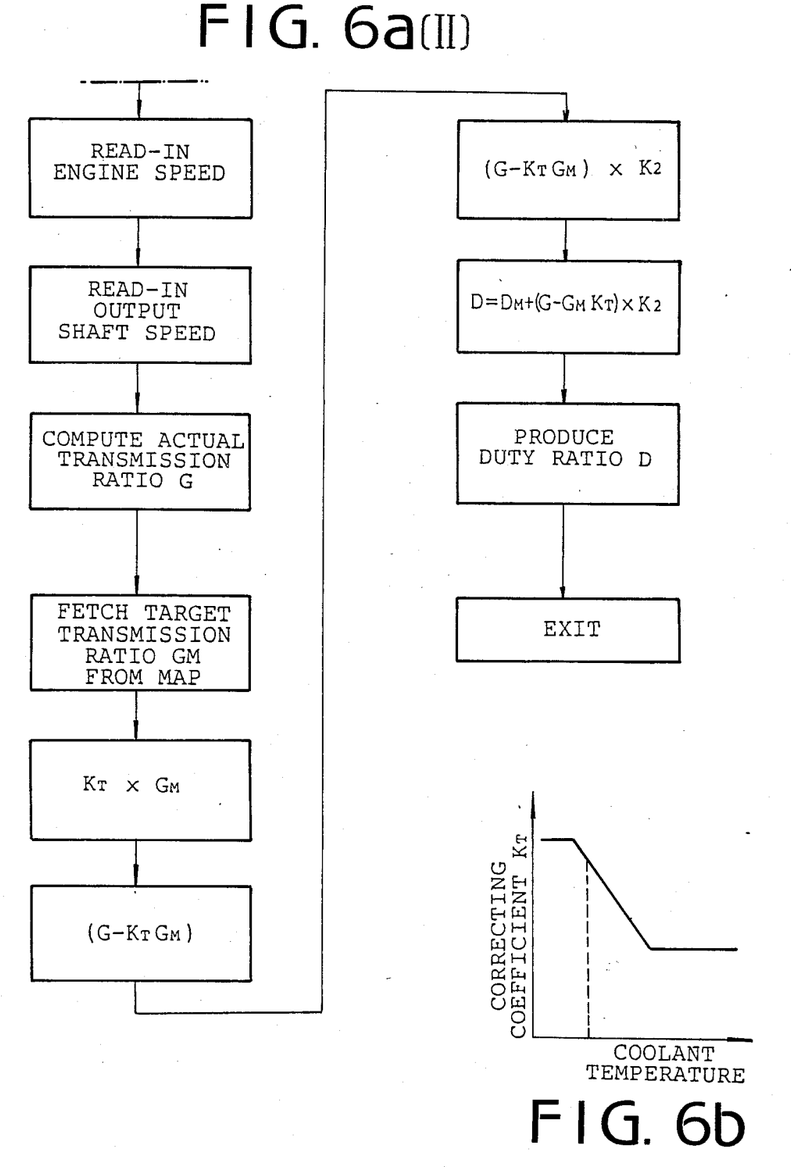

FIG. 6 shows an example of temperature correction, which is effective to compensate for a decrease of the power of the engine at cold engine operation. As shown in FIG. 6(b), a correcting coefficient KT is decided according to the temperature of the coolant. The duty ratio $D_M$ obtained by the map of FIG. 5(b) and the transmission ratio GM obtained by the map of FIG. 5(c) are corrected by the coefficient KT. As a result, the duty ratio of the signal applied to the solenoid operated valve 51 decreases, lowering the pressure in the chamber 27b. Thus, the transmission ratio becomes high (low speed).

Figure 7A:
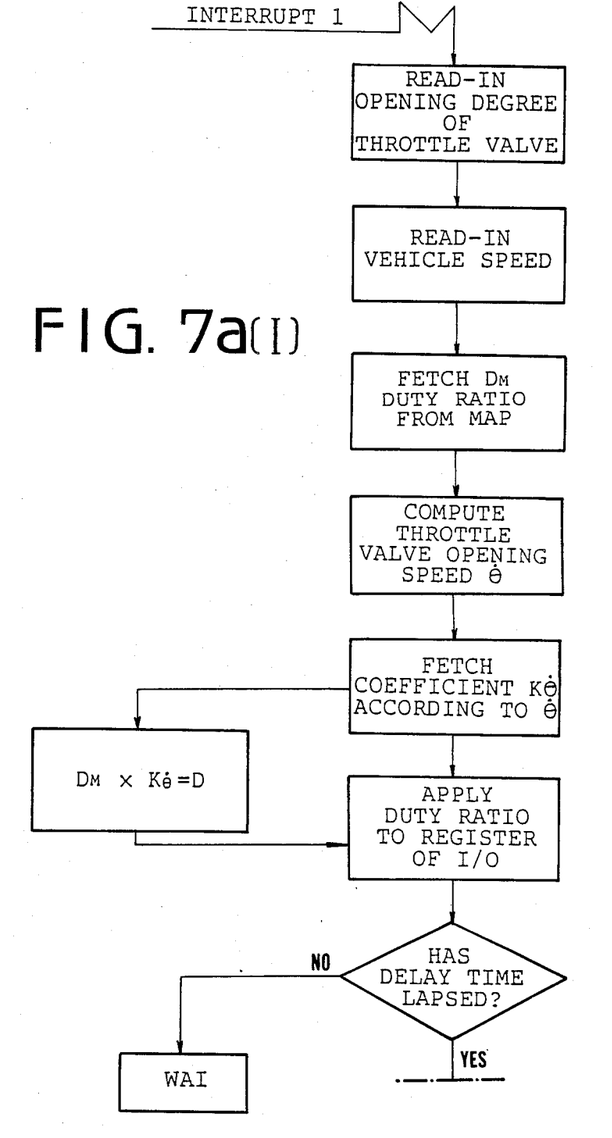
FIGS. 7(a) to 7(c) show flow charts of acceleration compensation and a graph showing a characteristic thereof.
Figures 7A, 7B:
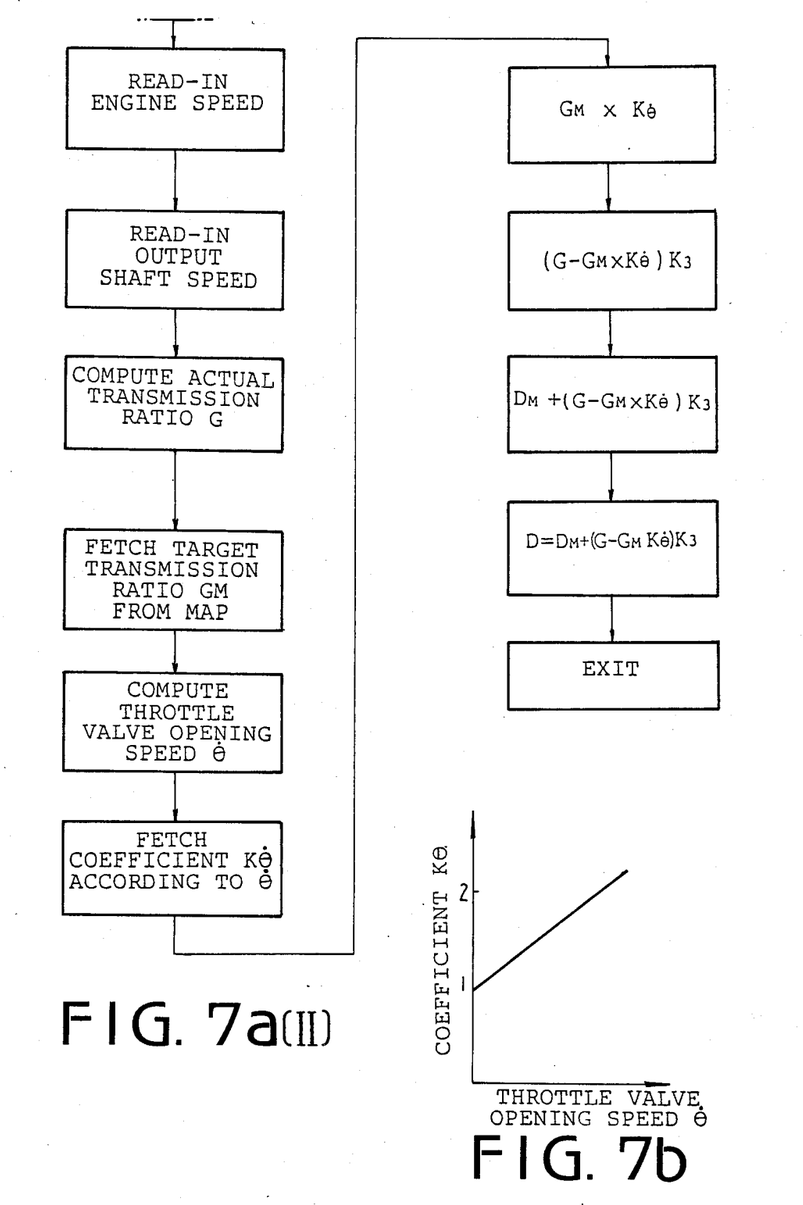

FIG. 7 shows an acceleration correcting control. As shown in FIG. 7(b), a correcting coefficient $K\theta$ is obtained in accordance with speed $\theta$ of the opening movement of the throttle valve. The duty ratio $D_M$ and transmission ratio GM are corrected by the correcting coefficient $K\theta$. The operation is shown in FIG. 7(a). When the throttle valve opening speed is high and the amount of the depression of the accelerator pedal is large, the transmission ratio is temporarily increased so as to produce a rapid acceleration effect.

Figure 7C:
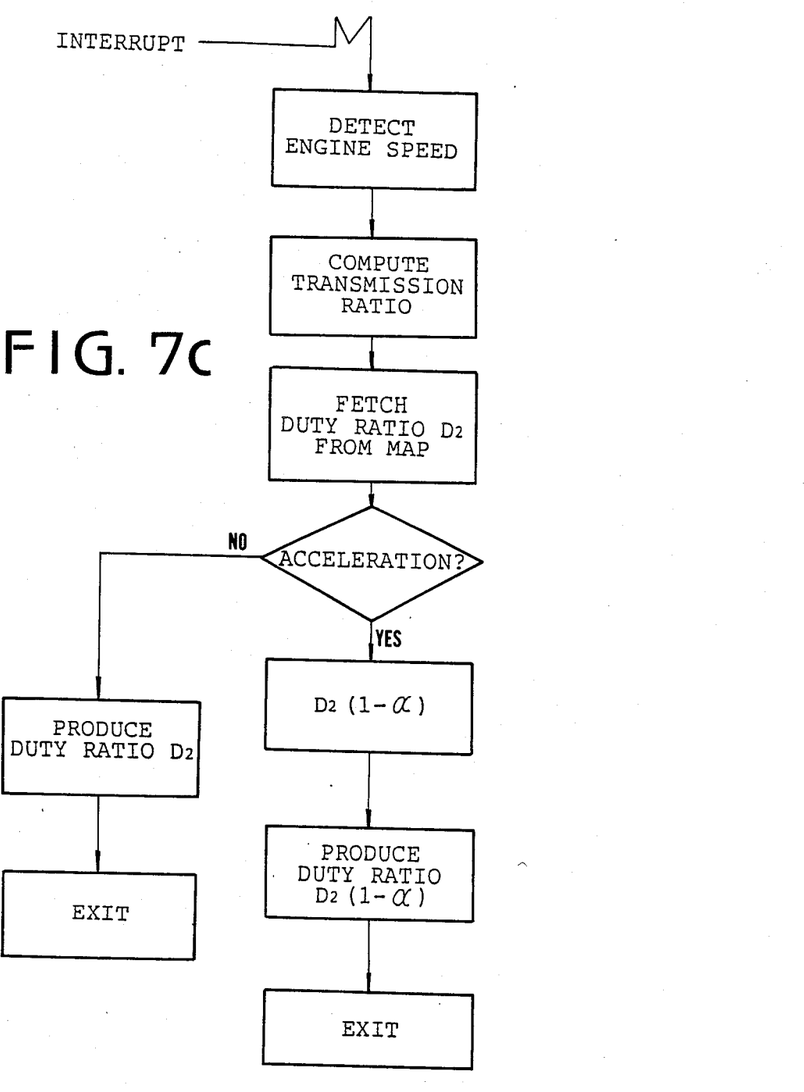

FIG. 7(c) shows another mode of operation for the acceleration. In the operation, the duty ratio $D_2$ which is obtained from the map of FIG. 4(b) in accordance with transmission ratio and engine speed is decreased at a constant ratio $\alpha$. Accordingly, the line pressure dependent on the solenoid operated valve 43 is temporarily increased, so that the transmission ratio is increased to low speed range.

Figure 8:
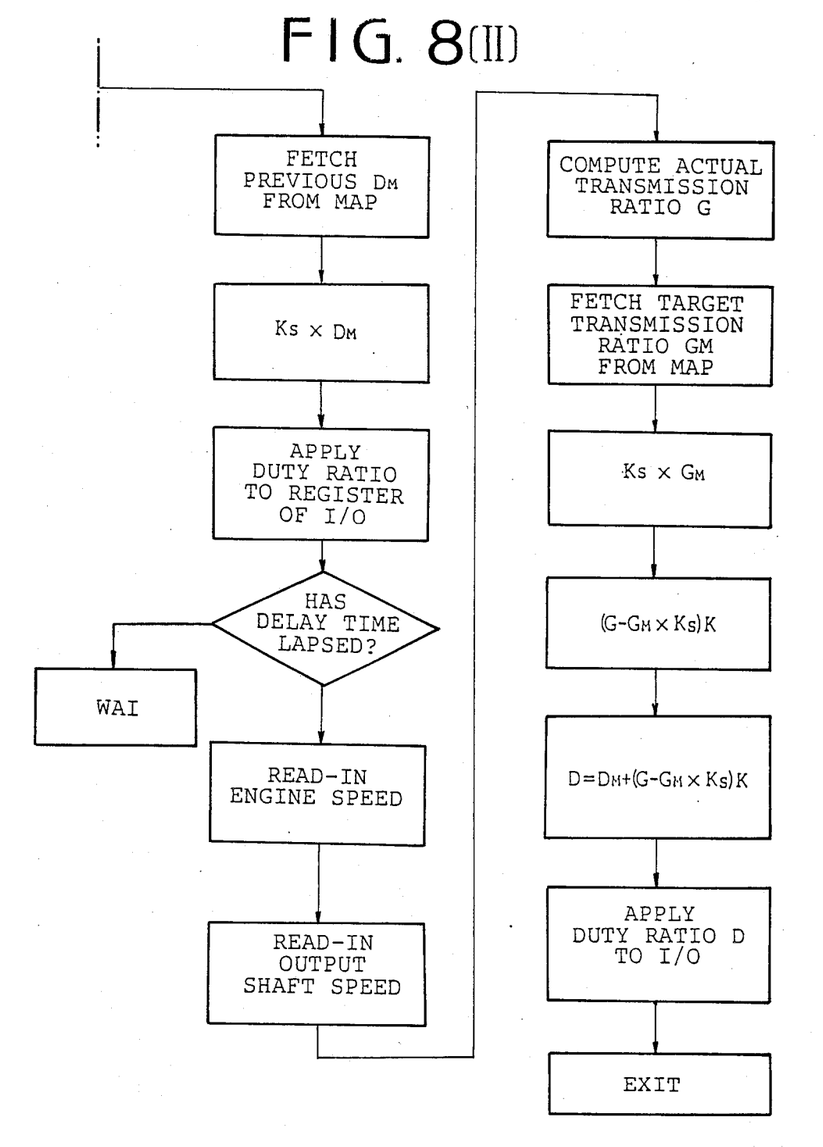
FIG. 8 is a flow chart of deceleration compensation.
Figure 8I:
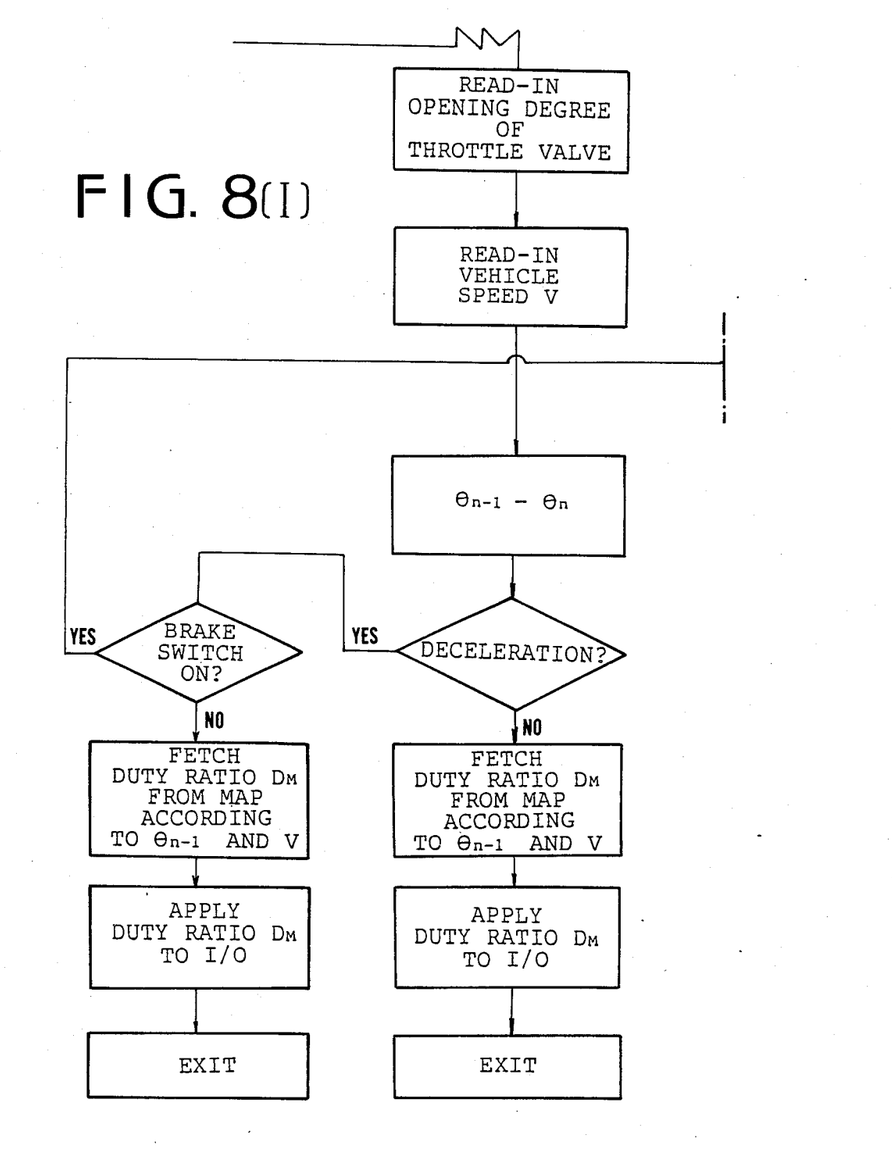

FIG. 8 shows a deceleration correcting control operation. In the operation, by the difference between the throttle opening degree $\theta_n$ at that time and degree $\theta_{n-1}$ at a previous time, a deceleration condition is detected. In deceleration conditions, the transmission ratio is maintained at the value at the previous degree $\theta_{n-1}$. When a brake switch operated by a brake pedal is closed, duty ratio $D_M$ and duty ratio GM obtained by maps are corrected by a coefficient $K_s$ to decrease the duty ratio. As a result, the pressure of the control oil by the valve 51 increases, decreasing the pressure in the chamber 27b. Thus, the transmission ratio becomes high (low speed), so that the engine braking effect is enhanced.

Although the solenoid operated valves 43 and 51 are operated by pulses and the pressure of the oil is controlled by changing the duty ratio of the pulses, each valve can be controlled by varying the current passing in the solenoid.

From the foregoing, it will be understood that the system of the present invention comprises electrical sensors for detecting conditions of engine operations and for producing electrical signals, a transmission ratio control valve for varying the transmission ratio of a transmission, and a solenoid operated valve responsive to the signals for controlling the transmission ratio control valve. Since the valves are operated in dependency on electrical signals, the system is simplified in construction and a reliable control system can be provided.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a system for controlling a transmission ratio of an infinitely variable transmission for transmitting the power of an internal combustion engine, the infinitely variable transmission comprising a primary pulley having a hydraulically shiftable disc and a hydraulic cylinder for shifting the disc, a secondary pulley having a hydraulically shiftable disc and a hydraulic cylinder for shifting the disc of the secondary pulley, a belt engaged with both pulleys, and a first hydraulic circuit having a pump for supplying pressurized oil, an axially movable transmission ratio control valve having a spool responsive to engine speed for controlling the pressurized oil so as to move the disc of the primary pulley to change the transmission ratio and a drain passage, the improvement comprising:

a second hydraulic circuit means, comprising a regulator valve means, connected to the drain passage of the first hydraulic circuit for applying control oil from said regulator valve means to one end of said spool of the transmission ratio control valve so as to axially move the spool, said regulator valve means for keeping the control oil at a constant pressure;

means for detecting operating conditions of the engine and for producing electrical signals;

an electric control unit responsive to the electrical signals for producing control signals; and     an electromagnetic valve means provided in the second hydraulic circuit means and responsive to the control signals for controlling the amount of the control oil applied to said one end of the spool of said transmission ratio control valve, thereby controlling the transmission ratio.

2. The system for controlling the transmission ratio according to claim 1, further comprising     means comprising a pressure regulator valve for regulating the pressure of the pressurized oil in the first hydraulic circuit, and     another electromagnetic valve means responsive to said control signals for controlling said pressure regulator valve.

3. The system for controlling the transmission ratio according to claim 2, wherein     each of said regulator valves comprises a spool, an end chamber at one end of said regulator valves and at said one end of the spool of said transmission ratio control valve respectively and applied with the control oil controlled by respective of said electromagnetic valve means to shift said spools,     a spring disposed at other ends of said regulator valves and said transmission ratio control valve respectively to bias said spools, said spools being mounted so as to be displaceable by forces on said ends.

4. The system for controlling the transmission ratio according to claim 1, wherein     said regulator valve means provided in the second hydraulic circuit means comprises two spools and a connection member longitudinally connected therebetween having a reduced diameter relative to that of said two spools, and an inlet port and a longitudinally off-set outlet port operatively communicating with each other between said two spools, an end chamber defined by an end face of one of said two spools communicating with said outlet port, a drain port communicating with said end chamber, and a spring engaging an end face of the other of said two spools, said two spools and connection member being mounted displaceably relative to said inlet, outlet and drain ports by forces on said end faces, said inlet port communicating with said drain passage of said first hydraulic circuit, said outlet port communicating with said one end of said spool of said transmission ratio control valve.

5. The system for controlling the transmission ratio according to claim 4, wherein     said outlet port communicates with said one end of said spool of the transmission ratio control valve.

6. The system for controlling the transmission ratio according to claim 5, wherein     said electromagnetic valve means communicates with said one end of said spool of the transmission ratio control valve and an oil reservoir.

7. The system for controlling the transmission ratio according to claim 1, wherein     said drain passage communicates with said transmission ratio control valve and an oil reservoir, and     a check valve is disposed in said drain passage downstream of a branch thereof to said regulator valve means, said branch forming a part of said second hydraulic circuit means, and     a restrictor in said branch.

* * * * *